US008791962B2

(12) United States Patent
Noda et al.

(10) Patent No.: US 8,791,962 B2
(45) Date of Patent: Jul. 29, 2014

(54) INFORMATION PROCESSING DEVICE, INFORMATION PROCESSING METHOD, AND PROGRAM FOR 3D OBJECT SELECTION AND INTERACTION

(75) Inventors: Takuro Noda, Tokyo (JP); Akihiro Komori, Tokyo (JP); Nariaki Satoh, Kanagawa (JP); Osamu Shigeta, Tokyo (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 437 days.

(21) Appl. No.: 13/152,824

(22) Filed: Jun. 3, 2011

(65) Prior Publication Data
US 2012/0007857 A1   Jan. 12, 2012

(30) Foreign Application Priority Data

Jul. 8, 2010   (JP) ................................ P2010-155623

(51) Int. Cl.
*G06F 3/048* (2013.01)
*G06T 15/00* (2011.01)
*G09G 5/02* (2006.01)

(52) U.S. Cl.
USPC ............................ 345/642; 345/419; 715/852

(58) Field of Classification Search
CPC . G06F 3/04815; G06F 3/0482; G06F 3/0481; G06F 3/048; G06F 3/04817; G06F 3/04812; G06F 3/04842; G06F 3/04845; G06F 3/0486; G06T 2200/24; G06T 19/20; G06T 19/003; H04N 21/8146
USPC ........... 345/642, 619, 622; 715/856, 848–852
See application file for complete search history.

(56) References Cited

U.S. PATENT DOCUMENTS

| 5,777,616 | A  | * | 7/1998 | Bates et al. ................... 715/837 |
| 6,404,442 | B1 | * | 6/2002 | Hilpert et al. ................. 715/727 |
| 8,484,570 | B2 | * | 7/2013 | Konar et al. .................. 715/764 |
| 2008/0018595 | A1 | * | 1/2008 | Hildreth et al. ............... 345/156 |
| 2009/0015552 | A1 |  | 1/2009 | Kawasaki et al. |

(Continued)

FOREIGN PATENT DOCUMENTS

| EP | 1 821 182 A1 | 8/2007 |
| JP | 2009-15765 | 1/2009 |

(Continued)

OTHER PUBLICATIONS

Elmqvist et al., Semantic Pointing for Object Picking in Complex 3D Environments; Graphics Interface 2008, ACM 2008.*

(Continued)

*Primary Examiner* — Carlos Perromat
(74) *Attorney, Agent, or Firm* — Sherr & Jiang, PLLC

(57) ABSTRACT

There is provided an information processing device including a display section configured to display a first object in a virtual three-dimensional space having a depth direction of a display screen, an operation section configured to acquire an operation for moving the first object in at least the depth direction, and a controller configured to move the first object on the display screen in accordance with the acquired operation, to execute, when a region of the first object overlaps a first overlap determination region, a first process to one or both of the first and second objects, and to execute, when the region of the first object overlaps a second overlap determination region, a second process to one or both of the first and second objects. The first overlap determination region may be a region obtained by extending the second overlap determination region in at least the depth direction.

16 Claims, 12 Drawing Sheets

(56) References Cited

U.S. PATENT DOCUMENTS

2009/0064055 A1* 3/2009 Chaudhri et al. ............ 715/863
2009/0217209 A1  8/2009 Chen et al.

FOREIGN PATENT DOCUMENTS

| JP | 2009-528514 | 8/2009 |
| JP | 2009-265258 | 11/2009 |
| WO | WO 2007/096893 A2 | 8/2007 |

OTHER PUBLICATIONS

European Search Report issued Nov. 8, 2011 in Berlin for corresponding European patent application No. EP 11 17 1874.

* cited by examiner

INFORMATION PROCESSING DEVICE, INFORMATION PROCESSING METHOD, AND PROGRAM FOR 3D OBJECT SELECTION AND INTERACTION

BACKGROUND

The present disclosure relates to an information processing device, an information processing method, and a program. In particular, the present disclosure relates to an information processing device, an information processing method, and a program for displaying a GUI (Graphical User Interface) as a virtual three-dimensional space.

In recent years, GUIs provided to users via display screens have been more commonly displayed as virtual three-dimensional spaces. In a virtual three-dimensional space, objects such as content can be arranged not only in the horizontal direction and the vertical direction of the display screen, but also in the depth direction of the display screen. Therefore, on a GUI displayed as a virtual three-dimensional space, a space in the display screen can be effectively used. As an example of such technologies, JP 2009-265258A describes a technology for displaying a plurality of objects by superimposing them in the depth direction in order according to the operations of a user.

In regard to a GUI displayed as a virtual three-dimensional space such as the one described above, there have been developed technologies for acquiring an operation of a user not only in the horizontal direction and the vertical direction of the display screen but also in the depth direction of the display screen, so that an object such as content can also be moved in the depth direction. For example, JP 2009-15765A describes a technology for detecting an operation of a user in the depth direction with a controller on the basis of a change in the amplitude of radio waves of a millimeter-band. In addition, JP 2009-528514A describes a technology for detecting an operation in the depth direction from a gesture of a user through an analysis using optical ranging and speckle patterns.

SUMMARY

On a GUI displayed as a two-dimensional plane, an operation of superimposing the display positions of two objects is typically performed through a so-called drag-and-drop operation for executing some processes related to the two objects. However, when a plurality of objects can be displayed such that they overlap one another in the depth direction as described in JP 2009-265258A, there is a problem in that no operation corresponding to the aforementioned drag-and-drop operation exists. Further, when an object is moved in the depth direction through an operation of a user as described in JP 2009-15765A and JP 2009-528514A, there is a problem in that it is difficult for the user to perceive the position of the object in the depth direction of a virtual three-dimensional space, and thus the object is difficult to be moved to a desired position.

In light of the foregoing, it is desirable to provide a novel and improved information processing device, information processing method, and program that can improve the operability of a GUI displayed as a virtual three-dimensional space.

According to an embodiment of the present disclosure, there is provided an information processing device including a display section configured to display a first object in a virtual three-dimensional space, the virtual three-dimensional space having a depth direction of a display screen, an operation section configured to acquire an operation for moving the first object in at least the depth direction, and a controller configured to move a display of the first object on the display screen in accordance with the operation acquired by the operation section, to execute, in a first state in which a region of the first object overlaps a first overlap determination region that is set around a display region of a second object displayed on the display screen, a first process to one or both of the first object and the second object, and to execute, in a second state in which the region of the first object overlaps a second overlap determination region that is set around the display region, a second process that is different from the first process to one or both of the first object and the second object. The first overlap determination region may be a region obtained by extending the second overlap determination region in at least the depth direction.

According to the aforementioned configuration, it is possible to perform a process of informing (e.g., displaying) a user of the fact that, for example, objects are approaching each other in the depth direction of a virtual three-dimensional space. Therefore, when the user attempts to move an object in the virtual three-dimensional space, he can perceive the distance of the object in the depth direction and thus can easily move the object to a desired position.

The first process may be a process of displaying a visual effect region around one or each of the first object and the second object, the visual effect region having a different color from the virtual three-dimensional space, and the second process may be a process of changing the color of the visual effect region.

The first object may be a pointer object, and the second object may be an object operated by the pointer object.

The first object may be an object operated by a pointer object, the operation section may acquire as the operation for moving the first object an operation for moving the pointer object while causing the pointer object to hold the first object, and the controller may execute, when holding of the first object by the pointer object is released in the first state, a third process to one or both of the first object and the second object, and may execute, when holding of the first object by the pointer object is released in the second state, a fourth process that is different from the third process to one or both of the first object and the second object.

The third process may be a specific process represented by the second object and executed on the first object, and the fourth process may be a process of interchanging a display position of the first object and a display position of the second object.

The first overlap determination region may encompass the second overlap determination region, and the second overlap determination region may encompass the display region.

According to another embodiment of the present disclosure, there is provided an information processing method including displaying a first object in a virtual three-dimensional space, the virtual three-dimensional space having a depth direction of a display screen, acquiring an operation for moving the first object in at least the depth direction, and moving a display of the first object on the display screen in accordance with the acquired operation, executing, in a first state in which a region of the first object overlaps a first overlap determination region that is set around a display region of a second object displayed on the display screen, a first process to one or both of the first object and the second object, and executing, in a second state in which the region of the first object overlaps a second overlap determination region that is set around the display region, a second process that is different from the first process to one or both of the first object and the second object. The first overlap determination region may be a region obtained by extending the second overlap determination region in at least the depth direction.

According to still another embodiment of the present disclosure, there is provided a program for causing a computer to function as a display section configured to display a first object in a virtual three-dimensional space, the virtual three-dimensional space having a depth direction of a display screen, an operation section configured to acquire an operation for moving the first object in at least the depth direction, and a controller configured to move a display of the first object on the display screen in accordance with the operation acquired by the operation section, to execute, in a first state in which a region of the first object overlaps a first overlap determination region that is set around a display region of a second object displayed on the display screen, a first process to one or both of the first object and the second object, and to execute, in a second state in which the region of the first object overlaps a second overlap determination region that is set around the display region, a second process that is different from the first process to one or both of the first object and the second object. The first overlap determination region may be a region obtained by extending the second overlap determination region in at least the depth direction.

According to the embodiments of the present disclosure described above, the operability of a GUI displayed as a virtual three-dimensional space can be improved.

DETAILED DESCRIPTION OF THE EMBODIMENTS

Figure 1:
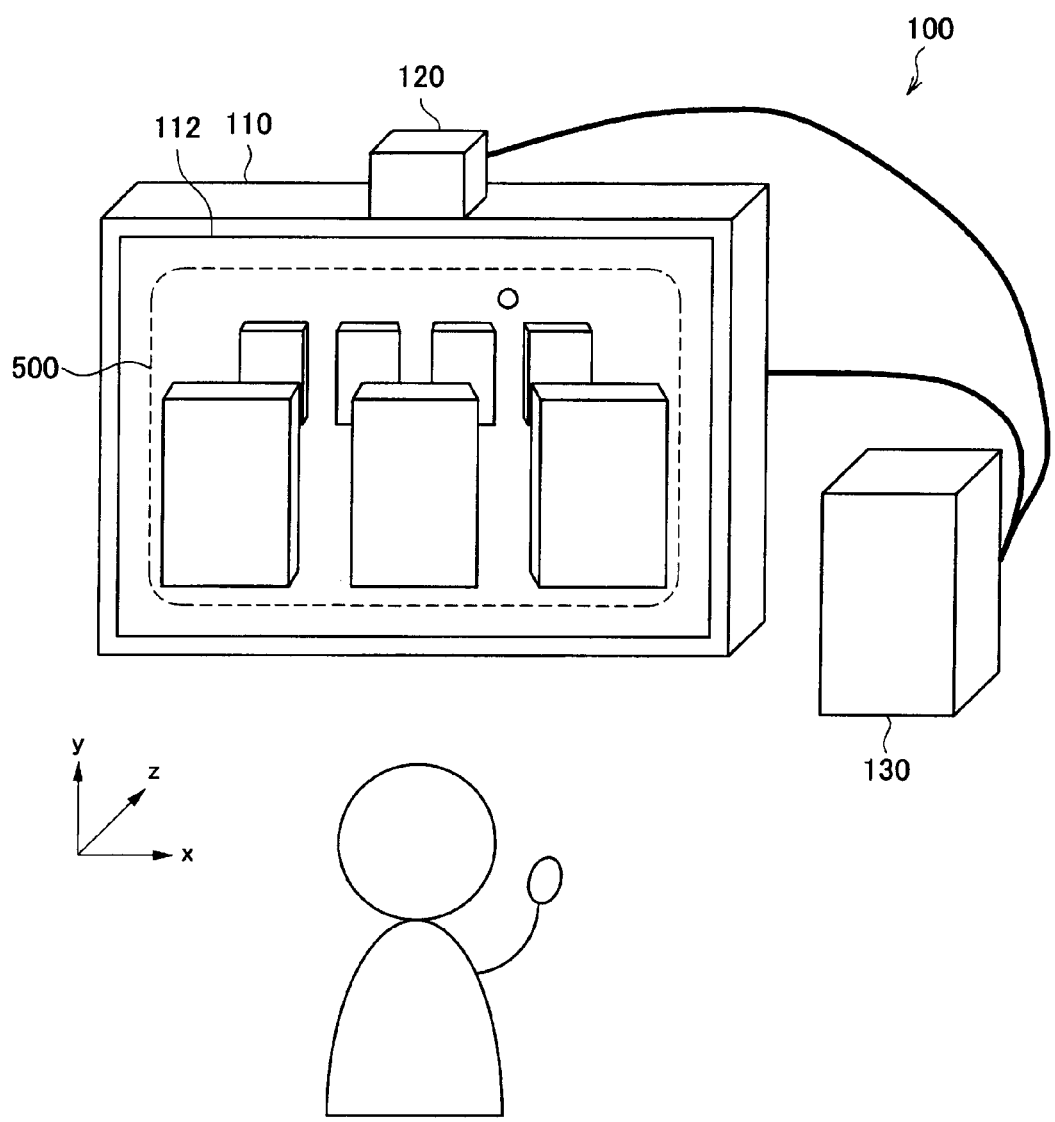
FIG. 1 is a diagram showing a schematic configuration of an information processing device in accordance with each embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Configuration Common to Each Embodiment
1-1. Device Configuration
1-2. Structures of Displayed Objects
2. First Embodiment
3. Second Embodiment
4. Third Embodiment
5. Supplement <1. Configuration Common to Each Embodiment>

First, a configuration that is common to each embodiment of the present disclosure will be descried with reference to FIGS. 1 to 5.

(1-1. Device Configuration)

Figure 2:
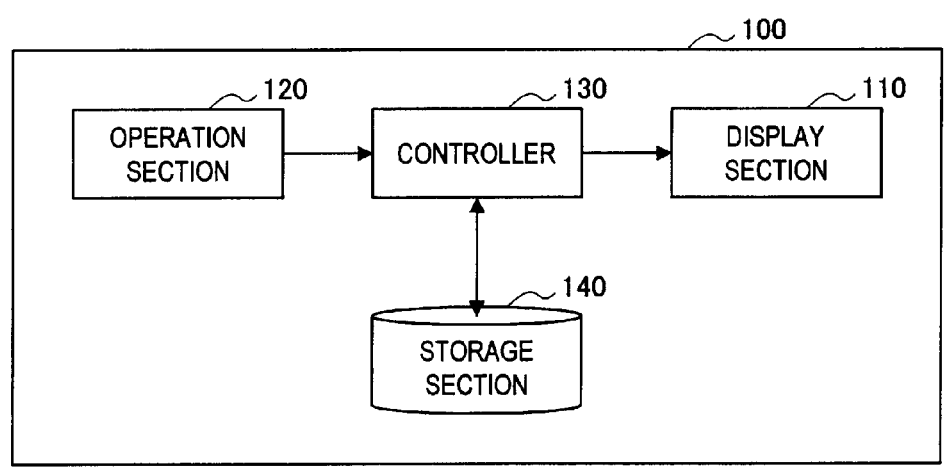
FIG. 2 is a block diagram showing the function and the configuration of the information processing device in accordance with each embodiment of the present disclosure.

FIG. 1 is a diagram showing a schematic configuration of an information processing device 100 in accordance with each embodiment of the present disclosure. FIG. 2 is a block diagram showing the function and the configuration of the information processing device 100 in accordance with each embodiment of the present disclosure. Referring to FIGS. 1 and 2, the information processing device 100 includes a display section 110, an operation section 120, a controller 130, and a storage section 140.

The display section 110 displays an object 500 in a virtual three-dimensional space that includes the depth direction of a display screen 112. The coordinate axes of the virtual three-dimensional space are shown as an x-axis, a y-axis, and a z-axis. Herein, the direction of the x-axis is the horizontal direction of the display screen 112. The direction of the y-axis is the vertical direction of the display screen 112. The direction of the z-axis is the depth direction of the display screen 112. The display section 110 can be, for example, a LCD (Liquid Crystal Display), a PDP (Plasma Display Panel), or an organic EL (Electro-Luminescence) panel.

The operation section 120 acquires an operation for moving the object 500 in a direction including at least the z-axis direction. The operation section 120 can be any type of device as long as it can acquire an operation of a user in the z-axis direction. For example, the operation section 120 can detect an operation of a user and acquire a result of the detection as a moving operation. In such a case, the operation of the user can be detected from the velocity of a controller gripped by the user or electromagnetic waves emitted from the controller. In addition, an operation such as a gesture of a user can be directly detected through, for example, optical ranging using an infrared laser, a TOF (Time Of Flight) scheme, and the like. Further, the operation section 120 can acquire the aforementioned detection result as an operation processed through an analysis using, for example, speckle patterns. In addition, the operation section 120 can be a pointing device such as a mouse that is developed for operation in a three-dimensional space.

Further, the operation section 120 can acquire as an operation for moving the object 500 an operation for causing a pointer object to hold the object 500 and moving the pointer object. The operation for causing the pointer object to hold the object 500 can be acquired through, for example, an operation of holding down a button of the aforementioned controller or pointing device such as a mouse. Alternatively, when an operation such as a gesture of a user is directly detected, the operation for causing the pointer object to hold the object 500 can be acquired through a specific operation of the user such as clenching or unclenching of his hand.

The controller 130 controls the display section 110 and the operation section 120. The controller 130 can be either dedicated hardware that is implemented with a circuit configuration including an integrated circuit, for example, or a CPU (Central Processing Unit) that executes a program stored in the storage section 140. The controller 130 can move the display of the object 500 on the display screen 112 in accordance with an operation acquired by the operation section 120, and can further execute a first process to one or both of the object 500 and another object 500 in a first state in which a region of the object 500 overlaps a first overlap determination region that is set around a display region of the other object 500 displayed on the display screen 112, and can also execute a second process that is different from the first process to one or both of the object 500 and another object 500 in a second state in which the region of the object 500 overlaps a second overlap determination region that is set around the display region. Note that the display region of the object 500, the first overlap determination region, the second overlap determination region, the first process, and the second process are described below.

The controller 130 can, when holding of the object 500 by the pointer object is released in the aforementioned first state, execute a third process to one or both of the object 500 and the other object 500. Meanwhile, the controller 130 can, when holding of the object 500 by the pointer object is released in the aforementioned second state, execute a fourth process that is different from the third process to one or both of the object 500 and the other object 500. The third process and the fourth process are described below.

The aforementioned display section 110, operation section 120, and controller 130 can be either provided separately as shown in FIG. 1 or be integrated into one. The function of the controller 130 can be either provided by a device that is directly connected to the display section 110 and the operation section 120 as shown, or by a server that is connected over a network.

The storage section 140 stores data that is necessary to perform a process in the information processing device 100. The storage section 140 can be implemented by combining as appropriate a storage device such as ROM (Read Only Memory) or RAM (Random Access Memory) and a removable storage medium such as an optical disc, a magnetic disk, or semiconductor memory. When the controller 130 is a CPU, the storage section 140 can store a program to be executed by the CPU. Such program can be downloaded from a server (not shown) on a network via a communication section (not shown) of the information processing device 100 and then stored into the storage device. Alternatively, such program can be provided by being stored in the aforementioned removable storage medium.

In addition to the foregoing, the information processing device 100 can also include as appropriate an audio output section (not shown) for outputting audio for the user, a physical feedback section (not shown) for outputting physical feedback such as a vibration of the controller for the user, and the like.

(Example of Acquisition of Operation)

In each embodiment of the present disclosure, the operation section 120 can acquire as an operation for moving the object 500 an operation for causing a pointer object to hold the object 500 and moving the pointer object. As an example of such operation, description will now be made more specifically of a case in which the operation section 120 shown in FIG. 1 acquires the aforementioned operation from a gesture of a user. Note that a similar operation can also be acquired with the other configurations of the operation section 120 as described above.

First, a user moves his hand in any of an up-and-down direction, a right-and-left direction, and a back-and-forth direction in front of the display screen 112 and the operation section 120. At this time, the operation section 120 acquires the movement of the hand of the user as an operation for moving a pointer object. Then, the controller 130 moves the display of the pointer object on the display screen 112 in accordance with the acquired operation. Specifically, when the user moves his hand to the right in front of the display screen 112, the operation section 120 acquires such operation as an operation for moving the pointer object to the right, and thus the controller 130 moves the display of the pointer object in the positive direction of the x-axis. Meanwhile, when the user moves his hand to the front in front of the display screen 112, namely, in a direction approaching the display screen 112, the operation section 120 acquires such operation as an operation for moving the pointer object to the front, and thus the controller 130 moves the display of the pointer object in the positive direction of the z-axis.

Next, when the user clenches his hand, the operation section 120 acquires such gesture as an operation for causing the pointer object to hold the object 500, and thus the controller 130 causes the pointer object to hold the object 500 whose region overlaps the pointer object. While the operation section 120 is recognizing that the user is clenching his hand, the controller 130 moves the display of the object 500 on the display screen 112 along with the movement of the pointer object.

Further, when the user unclenches his hand, the operating unit 120 acquires such gesture as an operation for releasing the holding of the object 500 by the pointer object, and thus the controller 130 releases the object 500 held by the pointer object.

(1-2. Structures of Displayed Objects)

(Display of Pointer Object and Content Object)

Figure 3:
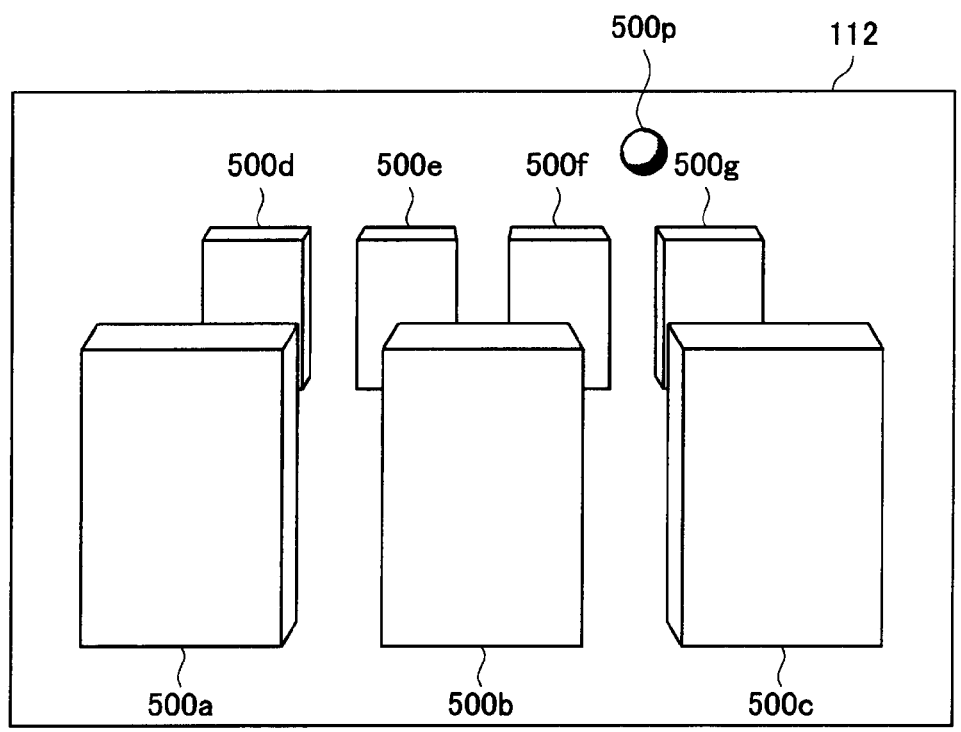
FIG. 3 is a diagram showing an example of a screen displayed on a display screen in accordance with each embodiment of the present disclosure.

FIG. 3 is a diagram showing an example of a screen displayed on the display screen 112 in accordance with each embodiment of the present disclosure. Referring to FIG. 3, the display screen 112 displays a pointer object 500*p* and content objects 500*a* to 500*g* as the objects 500.

The pointer object 500*p* is an object displayed for operating the content objects 500*a* to 500*g*. Although the pointer object 500*p* is shown as being approximately circular in shape, the present disclosure is not limited thereto, and the pointer object 500*p* can have a variety of shapes such as an arrow or a polyhedron. In order to show that the pointer object 500*p* is displayed in a virtual three-dimensional space, the following visual effects can also be provided, for example: the display size is changed according to the difference in the display position in the z-axis direction, the width in the z-axis direction is displayed, or a shadow is displayed.

The content objects 500*a* to 500*g* are applications for playing content such as, for example, moving images, still images, music, or character information; or application windows such as Web browsers. Alternatively, the content objects 500*a* to 500*g* can be icons representing content files. As a further alternative, the content objects 500*a* to 500*g* can be operation button icons for executing operations such as playback, pause, and stop of content. Although each of the content objects 500*a* to 500*g* is shown in the shape of a rectangular solid, the present disclosure is not limited thereto, and the content objects 500*a* to 500*g* can have a variety of shapes such as a sphere or a polyhedron. Further, in order to show that the content objects 500*a* to 500*g* are displayed in a virtual three-dimensional space, the following visual effects can also be provided, for example: the display size is changed according to the difference in the display position in the z-axis direction, the width in the z-axis direction is displayed, or a shadow is displayed.

Herein, the operation section 120 of the information processing device 100 can acquire as an operation to be performed on the pointer object 500$p$ an operation for moving the pointer object 500$p$ and an operation for causing the pointer object 500$p$ to hold one or more of the content objects 500$a$ to 500$g$. In such a case, the controller 130 moves the pointer object 500$b$ in accordance with the aforementioned operation for moving the pointer object 500$b$ acquired by the operation section 120. When the operation section 120 has acquired the aforementioned operation for causing the pointer object 500$b$ to hold one or more of the content objects 500$a$ to 500$g$ in a state in which a region of the pointer object 500$p$ overlaps a region(s) of any of the content objects 500$a$ to 500$g$, the controller 130 causes the pointer object 500$p$ to hold the corresponding object(s) of the content objects 500$a$ to 500$g$. One or more of the content objects 500$a$ to 500$g$ held by the point object 500$p$ move(s) with the movement of the pointer object 500$p$.

(Problem with Display in Virtual Three-Dimensional Space)

A display region of each object 500 displayed in a virtual three-dimensional space such as the one described above is defined by the x-coordinate, the y-coordinate, and the z-coordinate. On the display screen 112, coordinates that define the aforementioned display region are converted in dimension so that a perspective view seen from a particular viewpoint results. Consequently, the display region is represented by only the x-coordinate and the y-coordinate. Thus, even when display regions of the plurality of objects 500 are displayed as overlapping one another on the display screen 112, the z-coordinates thereof may differ in a virtual three-dimensional space and thus the display regions of the plurality of objects 500 may not overlap one another. For example, on the display screen 112 shown in FIG. 3, display regions of the content objects 500$a$ to 500$c$ and display regions of the content objects 500$d$ to 500$g$ are displayed as overlapping one another. However, in a virtual three-dimensional space, the z-coordinate of the display region of each object differs (the display regions of the content objects 500$a$ to 500$c$ are located on the front side). Therefore, in the virtual three-dimensional space, the display regions of the content objects 500$a$ to 500$c$ and the display regions of the content objects 500$d$ to 500$g$ do not overlap one another.

In such a virtual three-dimensional space, it would be difficult for a user to accurately move the objects 500 in the z-axis direction by operating the operation section 120. For example, assume that the user attempts to move the pointer object 500$p$ to place the display region of the pointer object 500$p$ over the display region of the content object 500$a$. In such a case, even when the display region of the pointer object 500$p$ overlaps the display region of the content object 500$a$ on the display of the display screen 112, the two display regions may not necessarily overlap each other in a virtual three-dimensional space as described above. In such a case, the user performs an operation of further moving the pointer object 500$p$ in the z-axis direction. However, the distance in the z-axis direction in the virtual three-dimensional space that is displayed on the display screen 112 is difficult to be perceived in comparison with the distances in the x-axis direction and the y-axis direction. Therefore, in the aforementioned case, it is difficult for the user to determine how much and in which direction the pointer object 500$p$ should be moved.

Thus, it is considered that representing some feedback when the display regions of the plurality of objects 500 overlap one another may make it easier for the user to recognize that the display regions of the plurality of objects 500 overlap one another. As an example of such feedback, displaying some visual effects is considered. Alternatively, changing the display is considered such as, for example, moving one of the objects 500 for evacuation purposes and interchanging the positions of two objects 500.

However, when each object 500 has the shape of a plate whose width in the z-axis direction of the display region is shorter than the widths in the x-axis and y-axis directions like the content objects 500$a$ to 500$g$ shown in FIG. 3, the time in which the display region of the pointer object 500$p$ that is moving in the z-axis direction overlaps the display region of each of the content objects 500$a$ to 500$g$ is short. Therefore, even when some visual effects are displayed as described above, there is a possibility that the user may not be able to fully recognize that the regions overlap one another.

(Example of Regions Set for Object)

Figure 4:
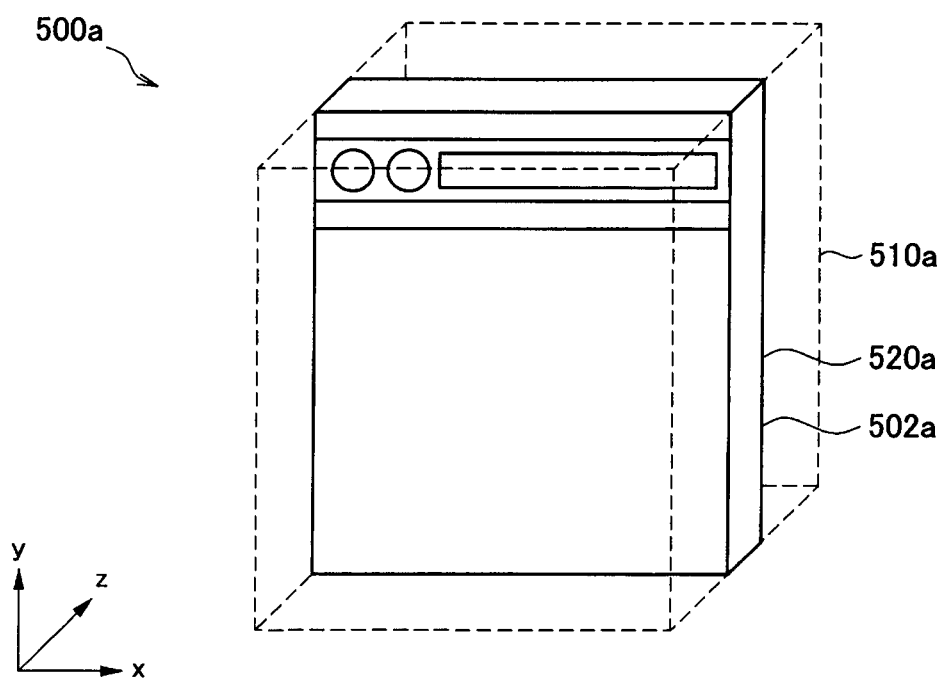
FIG. 4 is a diagram illustrating an example of regions set for an object in accordance with each embodiment of the present disclosure.

FIG. 4 is a diagram illustrating an example of regions set for the object 500 in accordance with each embodiment of the present disclosure. Referring to FIG. 4, a display region 502$a$, a reaction region 510$a$, which is a first overlap determination region, and a collision region 520$a$, which is a second overlap determination region, are set for the content object 500$a$ that is an example of the object 500. Note that in the following description, the display region, the reaction region, and the collision region of each object 500 may collectively be referred to as a display region 502, a reaction region 510, and a collision region 520, respectively.

The display region 502$a$ is a region where the content object 500$a$ is displayed. In the example of FIG. 4, the content object 500$a$ is shown as an application window. In such a case, the display region 502$a$ is a region where the application window is displayed such that it is visible to a user.

The reaction region 510$a$ is the first overlap determination region that is set to determine if the content object 500$a$ overlaps a region of another object 500 such as, for example, a display region of the pointer object 500$p$. The reaction region 510$a$ shown in the drawing is a region that is used for the controller 130 to determine the presence of overlap. Thus, the reaction region 510$a$ need not necessarily be displayed such that it is visible to the user on the display screen 112. The reaction region 510$a$ is set around the display region 502$a$. The reaction region 510$a$ is a region obtained by extending the collision region 520$a$ at least in the z-axis direction. In regard to the x-axis and the y-axis, the reaction region 510$a$ can coincide with the collision region 520$a$, for example.

The collision region 520$a$ is the second overlap determination region that is set to determine if the content object 500$a$ overlaps a region of another object 500 such as, for example, a display region of the pointer object 500$p$. In the example shown in the drawing, the collision region 520$a$ coincides with the display region 502$a$. As with the reaction region 510$a$, the collision region 520$a$ need not necessarily be displayed such that it is visible to the user on the display screen 112.

(Variation of Regions Set for Object)

Figure 5:
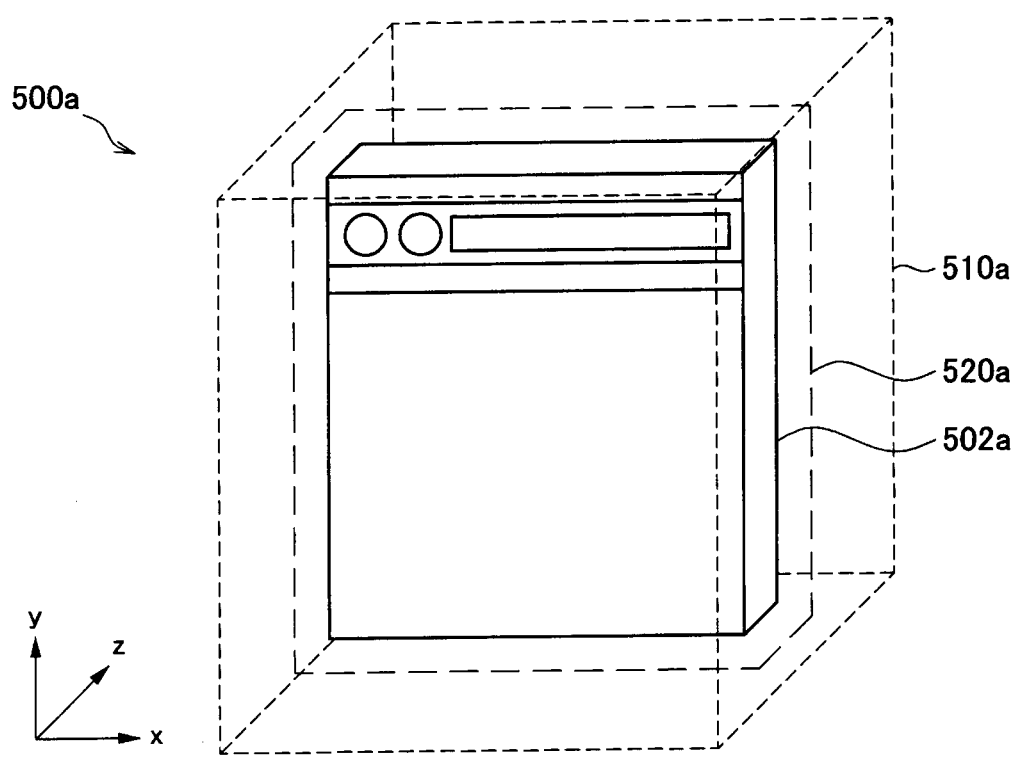
FIG. 5 is a diagram illustrating another example of regions set for an object in accordance with each embodiment of the present disclosure.

FIG. 5 is a diagram illustrating another example of regions set for the object 500 in accordance with each embodiment of the present disclosure. Referring to FIG. 5, the reaction region 510$a$ encompasses the collision region 520$a$, and the collision region 520$a$ encompasses the display region 502$a$.

In each embodiment of the present disclosure, each region of the object 500 can also be set as shown in FIG. 5. Specifically, the reaction region 510 can be a region obtained by extending the collision region 520 not only in the z-axis direction but also in the x-axis direction and the y-axis direction. In addition, the collision region 520 can be a region obtained by extending the display region 520 in the x-axis, y-axis, or z-axis direction.

<2. First Embodiment>

Next, the first embodiment of the present disclosure will be described with reference to FIGS. 6 to 9. In the first embodiment, the object 500 that is moved in response to an operation acquired by the operating unit 120 of the information processing device 100 is the pointer object 500p. In addition, another object 500 whose region will overlap the pointer object 500p as a result of the movement of the pointer object 500p is the content object 500a.

(Operation of when Reaction Region Overlaps)

Figure 6:
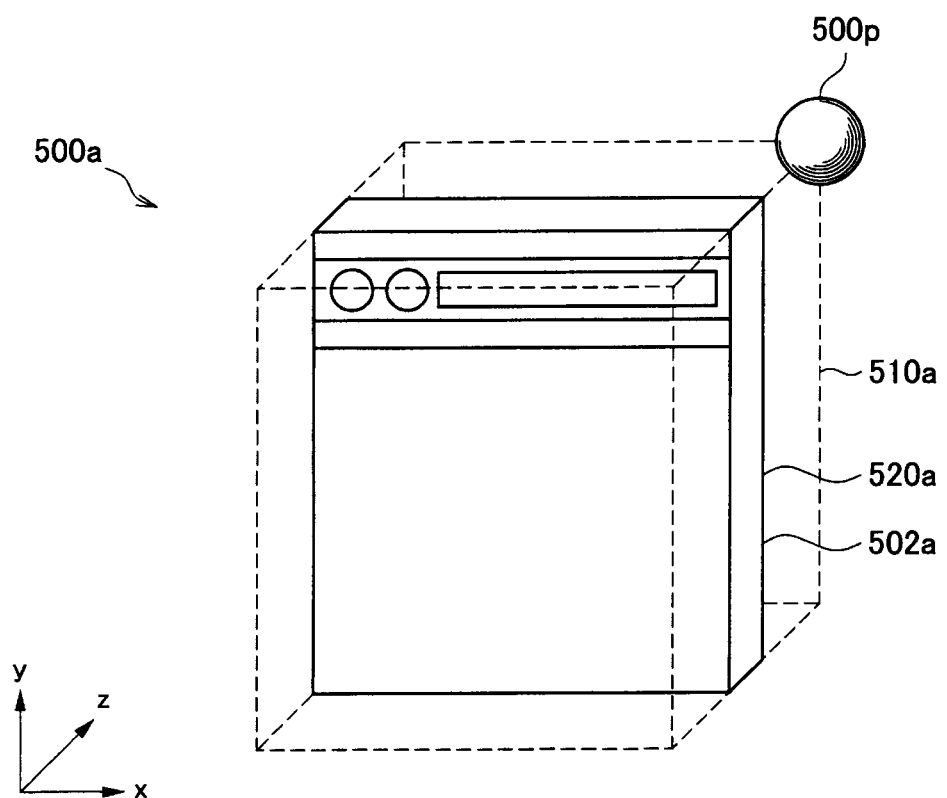
FIG. 6 is a diagram illustrating an example of determining if objects overlap each other in accordance with the first embodiment of the present disclosure.
Figure 7:
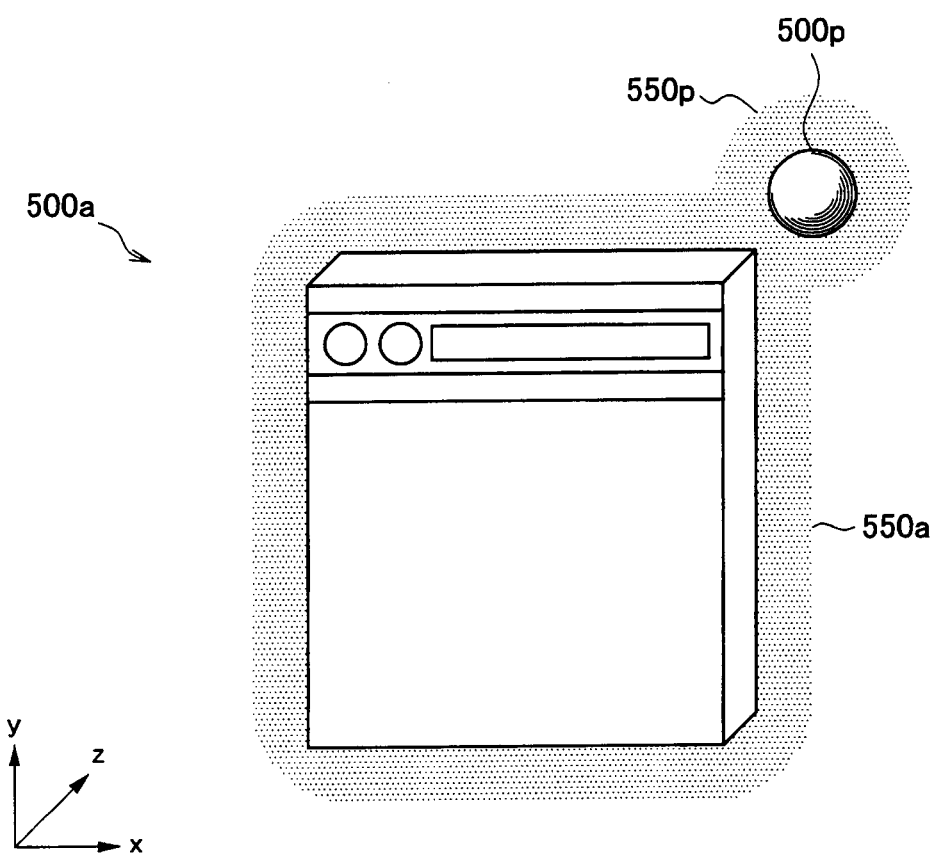
FIG. 7 is a diagram showing an example of a process executed in the case shown in FIG. 6.

FIG. 6 is a diagram illustrating an example of determining if the objects overlap each other in accordance with the first embodiment of the present disclosure. FIG. 7 is a diagram showing an example of a process executed in the case shown in FIG. 6.

Referring to FIG. 6, a region of the pointer object 500p overlaps the reaction region 510a that is the first overlap determination region set around the display region 502a of the content object 500a. Referring to FIG. 7, the controller 130 at this time displays a visual effect region 550p around the pointer object 500p as the first process executed in the aforementioned case. In addition, the controller 130 also displays a similar visual effect region 550a around the content object 500a. The controller 130 can display only one of the visual effect regions 550p and 550a. Note that in the following description, a visual effect region displayed around each object 500 may collectively be referred to as a visual effect region 550.

Herein, the visual effect region 550 can be displayed in a different color from the other portions in the virtual three-dimensional space displayed on the display screen 112 as in the example shown in the drawing, for example. In addition, the visual effect region 550 can be displayed with an illuminating visual effect. Further, the visual effect region 550 can be set such that it coincides with one of the reaction region 510 and the collision region 520, or be set independently of such regions.

The first process can be a process of not only displaying the visual effect region 550 but also moving one or both of the pointer object 500p and the content object 500a such that, for example, the pointer object 500p and the content object 500a are slightly moved to be pulled to each other or to repel each other. In addition, the first process can be a process of, when the information processing device 100 has an audio output section, outputting audio. Alternatively, the first process can be, when the information processing device 100 has a physical feedback section, outputting physical feedback such as a vibration of the controller. As a further alternative, the first process can be a combination of some or all of the aforementioned processes. In addition, the first process can differ for the pointer object 500p and the content object 500a. For example, in the example shown in the drawing, the colors of the visual effect region 550p and the visual effect region 550a can differ from each other.

(Operation of when Collision Region Overlaps)

Figure 8:
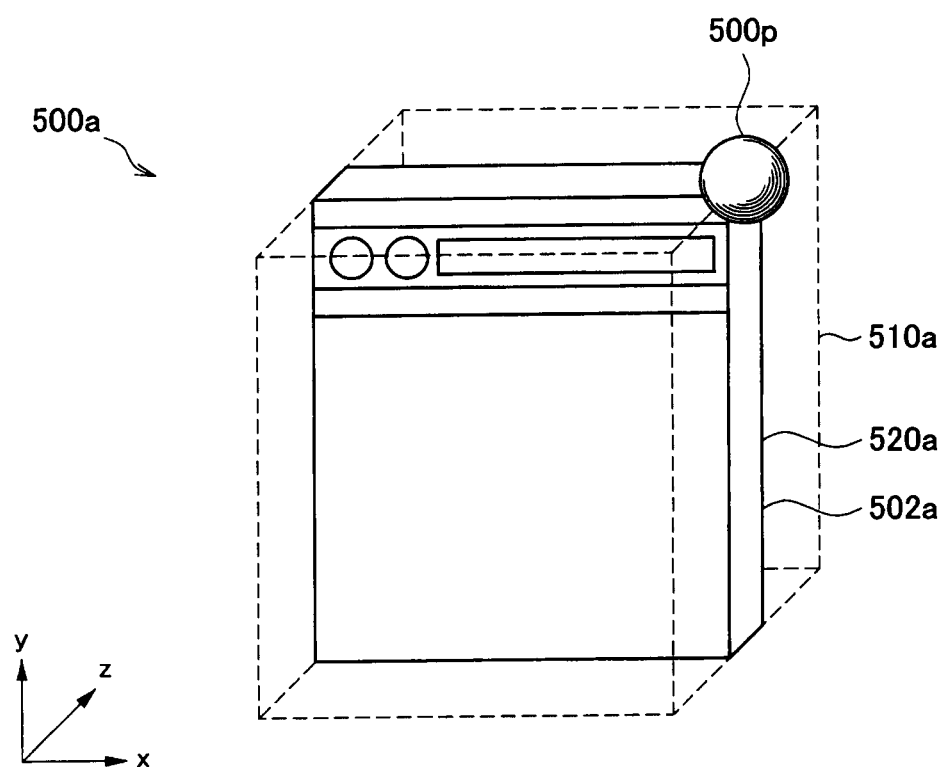
FIG. 8 is a diagram illustrating another example of determining if objects overlap each other in accordance with the same embodiment.
Figure 9:
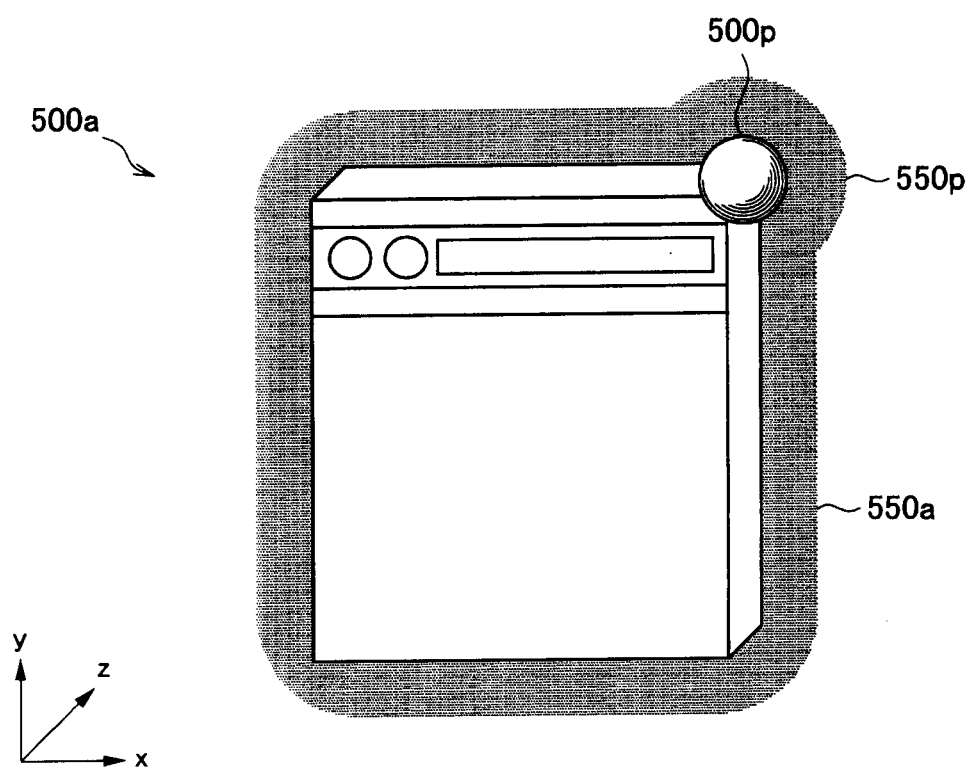
FIG. 9 is a diagram showing an example of a process executed in the case shown in FIG. 8.

FIG. 8 is a diagram illustrating another example of determining if the objects overlap each other in accordance with the first embodiment of the present disclosure. FIG. 9 is a diagram showing an example of a process executed in the case shown in FIG. 8.

Referring to FIG. 8, a region of the pointer object 500p overlaps the collision region 520a that is the second overlap determination region set around the display region 502a of the content object 500a. Referring to FIG. 9, the controller 130 at this time changes the color of the visual effect region 550p, which is displayed around the pointer object 500p, as the second process executed in the aforementioned case. In addition, the controller 130 similarly changes the color of the visual effect region 550a displayed around the content object 500a. The controller 130 can change only one of the colors of the visual effect regions 550p and 550a.

Herein, the controller 130 can display the visual effect region 550 by adding an illuminating visual effect thereto. In addition, the second process can be a process of not only changing the display color of the visual effect region 550 but also moving one or both of the pointer object 500p and the content object 500a such that, for example, the pointer object 500p and the content object 500a are slightly moved to be pulled to each other or to repel each other. In addition, the second process can be a process of, when the information processing device 100 has an audio output processing section, outputting audio. Alternatively, the second process can be, when the information processing device 100 has a physical feedback section, outputting physical feedback such as a vibration of the controller. As a further alternative, the second process can be a combination of some or all of the aforementioned processes. In addition, the second process can differ for the pointer object 500p and the content object 500a. For example, in the example shown in the drawing, the visual effect region 550p and the visual effect region 550a can be changed to different colors.

(Conclusion)

As described above, in the fist embodiment of the present disclosure, the collision region 520a of the content object 500a and the reaction region 510a that is obtained by extending the collision region 520a in the z-axis direction are used to determine if the content object 500a and the pointer object 500p overlap each other, and if they are determined to overlap each other, the visual effect region 550 is displayed around one or each of the content object 500a and the pointer object 500p, and further, the color of the visual effect region 550 is changed. According to such a structure, while a user is attempting to move the pointer object 500p in the z-axis direction to superimpose the pointer object 500p on the content object 500a, he can recognize that the pointer object 500p is moving closer to the content object 500a in a range that is wider than the range of the content object 500a displayed on the display screen 112. When the pointer object 500p further moves closer to the content object 500a, the color of the visual effect region 550 will change. Accordingly, the user can easily perceive if the pointer object 500p is moving closer to or away from the content object 500a.

<3. Second Embodiment>

Next, the second embodiment of the present disclosure will be described with reference to FIGS. 10 and 11. In the second embodiment, the object 500 that is moved in response to an operation acquired by the operation section 120 of the information processing device 100 is the content object 500c. In addition, another object 500 whose region will overlap the content object 500c as a result of the movement of the content object 500c is the content object 500b.

(Operation of when Reaction Region Overlaps)

Figure 10:
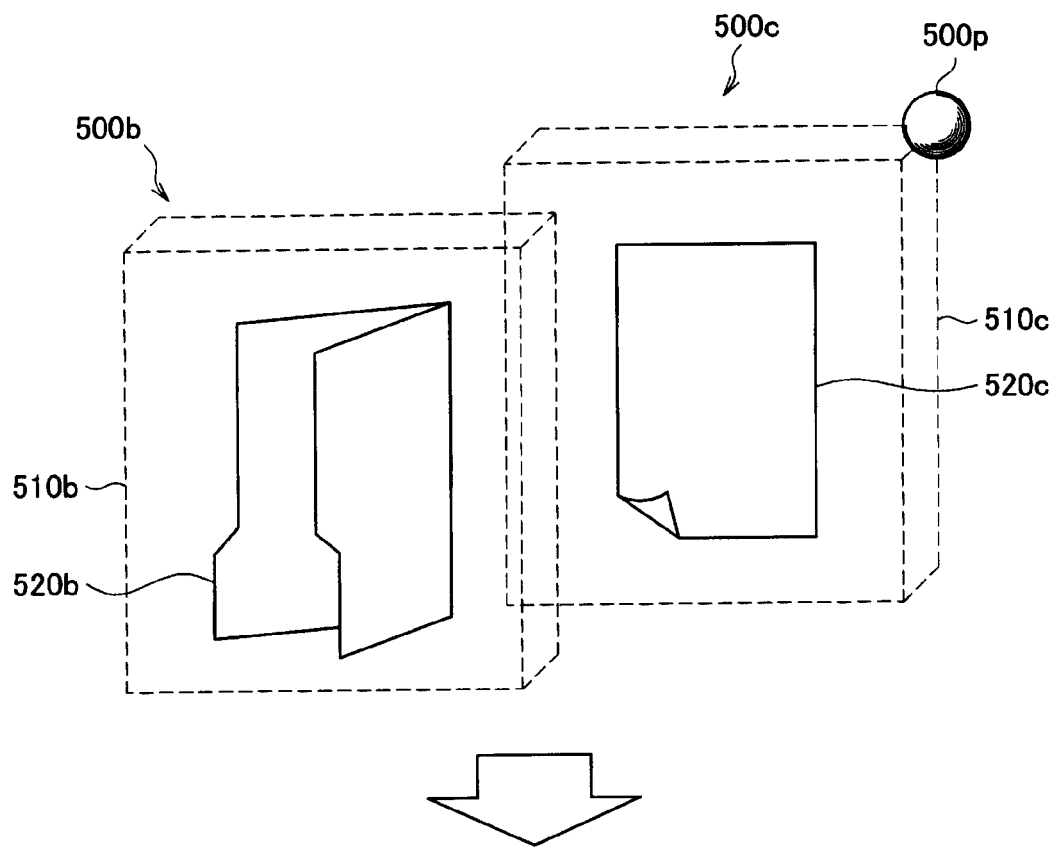
FIG. 10 is a diagram illustrating an example of a process executed in the second embodiment of the present disclosure.
Figure 10:
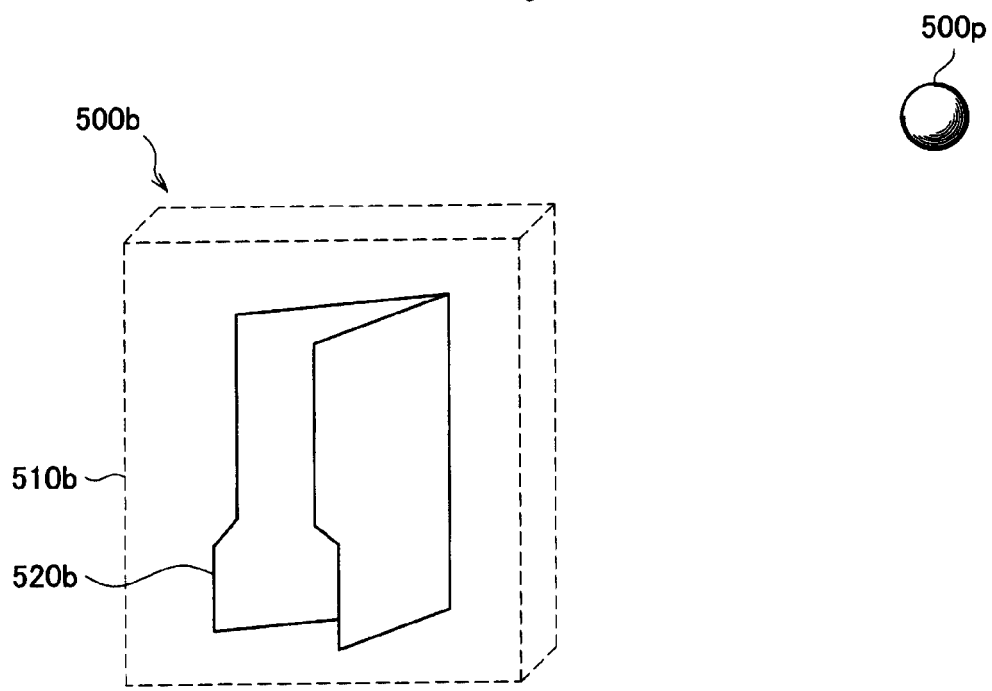

FIG. 10 is a diagram illustrating an example of a process executed in the second embodiment of the present disclosure. Referring to FIG. 10, the content object 500b is an icon representing a folder, and the content object 500c is an icon representing a file. The content object 500c is held by the pointer object 500p, and moves with the movement of the pointer object 500p. In the second embodiment, a reaction region 510*b* and a collision region 520*b* are set for the content object 500*b*, and further, a reaction region 510*c* and a collision region 520*c* are also set for the content object 500*c*.

In the initial state before a process is performed, the reaction region 510*b* of the content object 500*b* and the reaction region 510*c* of the content object 500*c* overlap each other. This state shall be referred to as a first state in which the object region of the content object 500*c* overlaps the reaction region 510*b* that is the first overlap determination region set around the display region of the content object 500*b*. In the example shown in the drawing, holding of the content object 500*c* by the pointer object 500*p* is released in the first state.

In this case, the controller 130 executes as the third process a specific process, which is represented by the content object 500*b*, on the content object 500*c*. As the content object 500*b* is an icon representing a folder, the specific process represented by the content object 500*b* herein is storage of a file into the folder. Accordingly, in a state after the process is performed, the file represented by the content object 500*c* is stored in the folder represented by the content object 500*b*.

(Operation of when Collision Region Overlaps)

Figure 11:
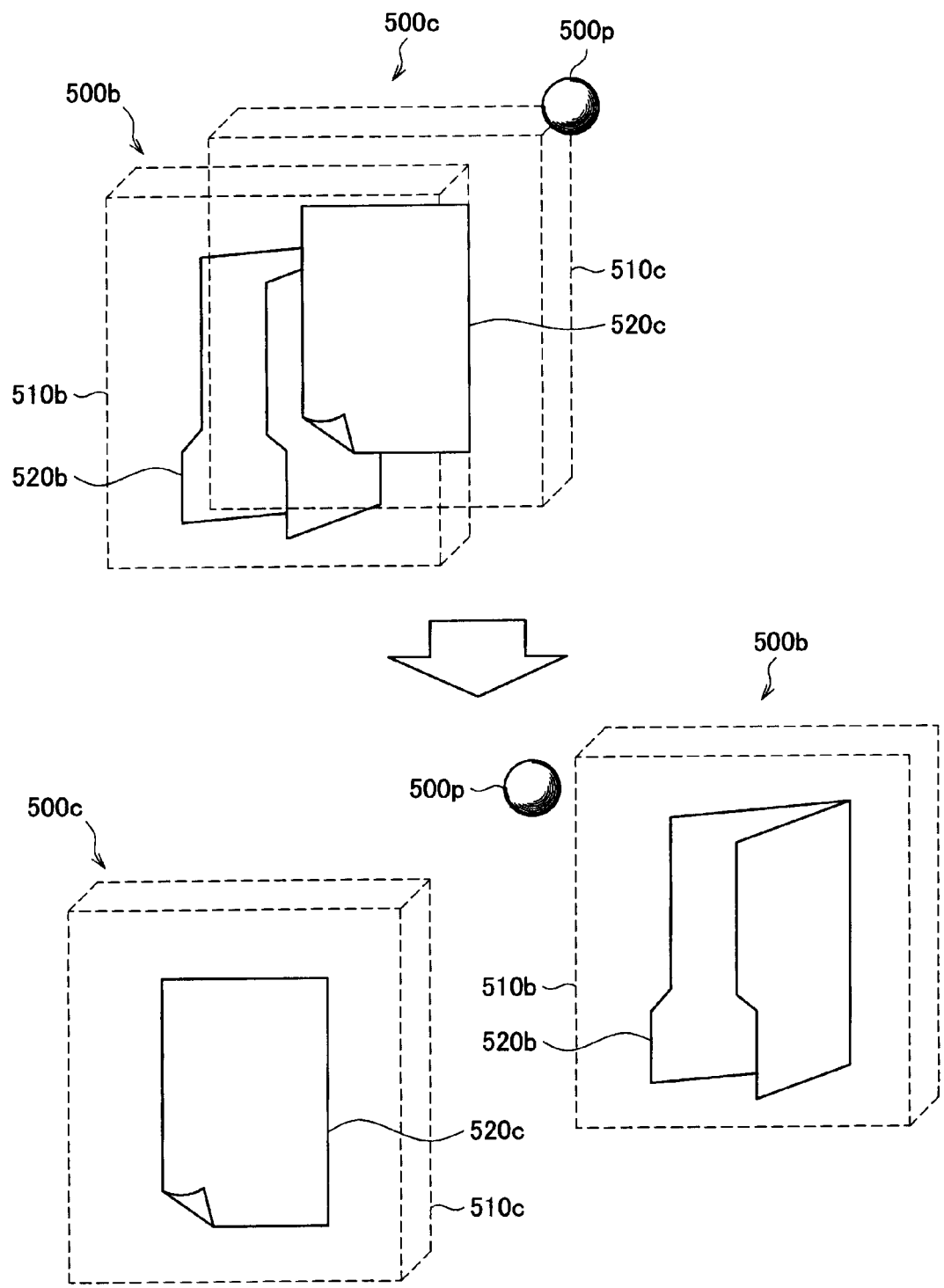
FIG. 11 is a diagram illustrating another example of a process executed in the same embodiment.

FIG. 11 is a diagram illustrating another example of a process executed in the second embodiment of the present disclosure. Referring to FIG. 11, the content object 500*b* is an icon representing a folder, and the content object 500*c* is an icon representing a file. The content object 500*c* is held by the pointer object 500*p*, and moves with the movement of the pointer object 500*p*.

In a state before a process is performed, the collision region 520*b* of the content object 500*b* and the collision region 520*c* of the content object 500*c* overlap each other. This state shall be referred to as a second state in which the object region of the content object 500*c* overlaps the collision region 520*b* that is the second overlap determination region set around the display region of the content object 500*b*. In the example shown in the drawing, holding of the content object 500*c* by the pointer object 500*p* is released in the second state.

In this case, the controller 130 executes as the fourth process a process of interchanging the display position of the content object 500*c* and the display position of the content object 500*b*. In a state after this process is performed, the content object 500*c* is displayed in the front position in which the content object 500*b* had been located before the process, while the content object 500*b* is displayed in the rear position in which the content object 500*c* had been located before the process. As shown in the drawing, the controller 130 can further move the positions of the two objects 500 after the process so that their reaction regions 510 do not overlap each other.

(Conclusion)

As described above, in the second embodiment of the present disclosure, the collision regions 520 of the objects 500 and the reaction regions 510 that are obtained by extending the collision regions 520 in the z-axis direction are used to determine is the objects 500 overlap each other, and when holding of one of the objects 500 by the pointer object is released, a process that would differ depending on the degree of overlap of each region is executed. According to such a structure, it is possible to, when the plurality of objects 500 overlap in their reaction regions 510, for example, execute a process like drag-and-drop on a two-dimensional GUI, and to execute, when the plurality of objects 500 overlap in their collision regions 520, a process of interchanging the display positions of the objects 500. According to such an operation, it is possible to implement an operation of adjusting the display positions by superimposing the regions in the z-axis direction and also implement an intuitive operation like drag-and-drop in a virtual three-dimensional space.

<4. Third Embodiment>

Next, the third embodiment of the present disclosure will be described with reference to FIG. 12. In the third embodiment, the visual effect region 550 described in the first embodiment is further displayed in the example of the content object 500*c* and the content object 500*b* described in the second embodiment.

Figure 12:
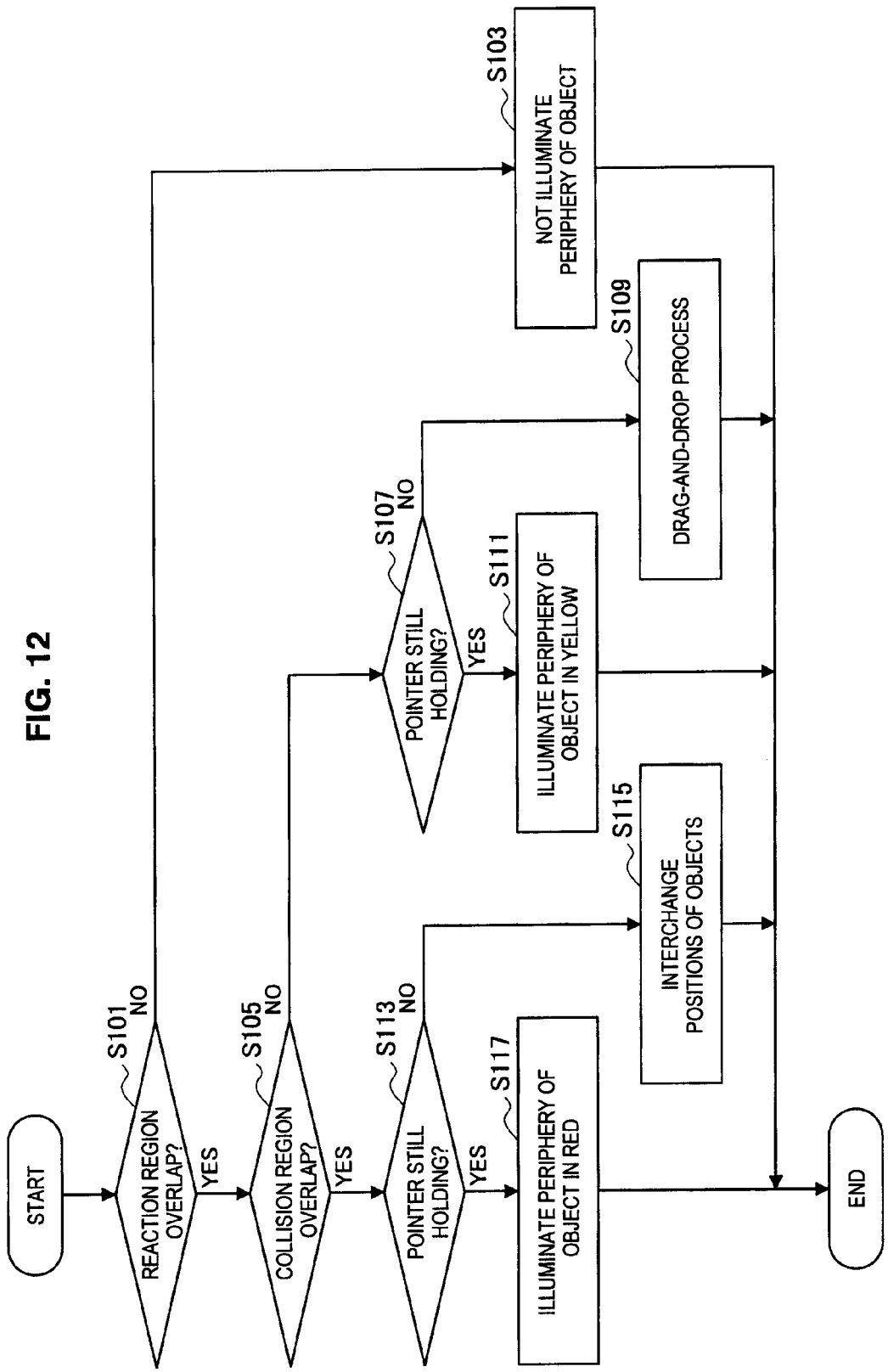
FIG. 12 is a flowchart showing a process of an information processing device in accordance with the third embodiment of the present disclosure.

FIG. 12 is a flowchart showing the process of the information processing device 100 in accordance with the third embodiment of the present disclosure. The process shown in FIG. 12 is a process executed periodically for the content object 500*c* that is held by the pointer object 500*p* and that moves with the movement of the pointer object 500*p*.

Note that the controller 130 herein displays a visual effect region 550*c* around the content object 500*c* as the first process for the content object 500*c*. At this time, the visual effect region 550*c* is displayed in yellow with an illuminating visual effect. In addition, the controller 130 changes the color of the visual effect region 550*c* to red as the second process for the content object 500*c*. At this time, the visual effect region 500*c* still has an illuminating visual effect. Further, the controller 130 executes as the third process for the content object 500*c* a drag-and-drop process between the content object 500*c* and the content object 500*b* such as, for example, storage of a file represented by the content object 500*c* into a folder represented by the content object 500*b*. In addition, the controller 130 executes as the fourth process for the content object 500*c* a process of interchanging the display position of the content object 500*c* and the display position of the content object 500*b*.

First, the controller 130 determines if the content objet 500*c* overlaps a region of another object 500 in the reaction region 510*c* (step S101). Herein, if the reaction region 510*c* of the content object 500*c* is not determined to overlap a region of another object 500, the controller 130 determines that the content object 500*c* does not overlap the other object 500. Herein, the controller 130, if the visual effect region 550*c* is displayed, terminates the display, turning off the light illuminating the periphery of the content object 500*c* (step S103), and terminates the process.

Meanwhile, if the content object 500*c* is determined to overlap a region of the content object 500*b* in the reaction region 510*c* in step S101, the controller 130 further determines if the content object 500*c* overlaps a region of the content object 500*b* in the collision region 520*c* (step S105). Herein, if the collision region 520*c* of the content object 500*c* is not determined to overlap a region of the content object 500*b*, the controller 130 determines that the content object 500*c* overlaps a region of the content object 500*b* only in the reaction region 510*c*.

In such a case, the controller 130 further determines if the pointer object 500*p*, which has held the content object 500*c*, is still holding the content object 500*c* (step S107). Herein, if the pointer object 500*p* is not determined to be holding the content object 500*c*, the controller 130 determines that holding of the content object 500*c* by the pointer object 500*p* has been released in the first state in which the content object 500*c* overlaps a region of the content object 500*b* in the reaction region 510*c*. Herein, the controller 130 executes as the third process for the content object 500*c* a drag-and-drop process between the content object 500*c* and the content object 500*b* (step S109), and terminates the process.

Meanwhile, if the pointer object 500*p* is determined to be still holding the content object 500*c* in step S107, the controller 130 determines that holding of the content object 500*c* by the pointer object 500*p* has been continuing in the first state in which the content object 500*c* overlaps a region of the content object 500*b* in the reaction region 510*c*. Thus, the controller 130, as the first process for the content object 500*c*, displays the visual effect region 550*c* and illuminates the periphery of the content object 500*c* in yellow (step S111), and then terminates the process.

Meanwhile, if the collision region 520*c* of the content object 500*c* is determined to overlap a region of the content object 500*b* in step S105, the controller 130 determines that the content object 500*c* overlaps the content object 500*b* in the collision region 520*c* as well. In such a case, the controller 130 further determines if the pointer object 500*p*, which has held the content object 500*c*, is still holding the content object 500*c* (step S113). Herein, if the pointer object 500*p* is not determined to be holding the content object 500*c*, the controller 130 determines that holding of the content object 500*c* by the pointer object 500*p* has been released in the second state in which the content object 500*c* overlaps a region of the content object 500*b* in the collision region 520*c*. Thus, the controller 130, as the fourth process for the content object 500*c*, interchanges the display position of the content object 500*c* and the display position of the content object 500*b* (step S115), and terminates the process.

Meanwhile, if the pointer object 500*p* is determined to be still holding the content object 500*c* in step S113, the controller 130 determines that holding of the content object 500*c* by the pointer object 500*p* has been continuing in the second state in which the content object 500*c* overlaps a region of the content object 500*b* in the collision region 520*c*. Thus, the controller 130, as the second process for the content object 500*c*, changes the color of the visual effect region 550*c* and illuminates the periphery of the content object 500*c* in red (step S117), and then terminates the process.

(Conclusion)

As described above, in the third embodiment of the present disclosure, when the object 500 moves while being held by a pointer object with the use of the reaction region 510 and the collision region 520 of the object 500, displays of the object 500 and another object 500 whose region overlaps the former object 500 are changed in stages. In addition, when holding of the object 500 by the pointer object is released, a drag-and-drop process and a positional adjustment are selectively executed in accordance with the overlapping region of the object 500 and the other object 500. With such a structure, the user can easily perceive the positional relationship of the object 500 with the other object 500 in the z-axis direction, and can also perform an operation of adjusting the display position as well as an intuitive operation like drag-and-drop in a virtual three-dimensional space.

<5. Supplement>

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

The present disclosure contains subject matter related to that disclosed in Japanese Priority Patent Application JP 2010-155623 filed in the Japan Patent Office on Jul. 8, 2010, the entire content of which is hereby incorporated by reference.

What is claimed is:

1. An information processing device comprising:
a display section, wherein:
the display section comprises a display screen configured to display a first 3D object and a second 3D object in a virtual three-dimensional space with the third dimension being a depth direction of the display screen,
the first 3D object has a first collision region surrounding the first 3D object,
the first 3D object has a first reaction region surrounding both the first 3D object and the first collision region,
the first reaction region is larger than the first collision region in at least the depth direction,
the second 3D object has a second collision region surrounding the second 3D object,
the second 3D object has a second reaction region surrounding both the second 3D object and the second collision region, and
the second reaction region is larger than the second collision region in at least the depth direction; and
a controller, wherein:
the controller is configured to move the first 3D object on the display screen in accordance with a received user input instruction,
the controller is configured to execute a reaction effect when the first reaction region of the first 3D object overlaps the second reaction region of the second 3D object,
the controller is configured to execute a collision effect when the first collision region of the first 3D object overlaps the second collision region of the second 3D object, and
the reaction effect is different from the collision effect.

2. The information processing device according to claim 1, wherein
at least one of the reaction effect and the collision effect comprises displaying a visual effect around at least one of the first 3D object and the second 3D object.

3. The information processing device according to claim 2, wherein the visual effect has a different color from the virtual three-dimensional space.

4. The information processing device according to claim 1, wherein
the first 3D object is a pointer object, and
the second 3D object is an object operated by the pointer object.

5. The information processing device according to claim 4, wherein visual effect comprises a reaction visual effect for the reaction effect and a collision visual effect for the collision effect, wherein the reaction visual effect is different than the collision visual effect.

6. The information processing device according to claim 5, wherein the reaction visual effect is a different color than the collision visual effect.

7. The information processing device according to claim 4, wherein the visual effect is complemented with an audio effect.

8. The information processing device according to claim 1, wherein the depth direction is substantially perpendicular to the surface of the display screen.

9. The information processing device according to claim 8, wherein at least one of:
the first reaction region is larger than the first collision region in both the depth direction and at least one direction substantially parallel to the surface of the display screen; and the second reaction region is larger than the second collision region in both the depth direction and at least one direction substantially parallel to the surface of the display screen.

10. The information processing device according to claim 1, comprising an operation section, wherein the operation section is configured to receive the user input instruction related to moving the first 3D object in at least the depth direction.

11. The information processing device according to claim 10, wherein
the first 3D object is an object operated by a pointer object,
the operation section acquires an operation that moves the first 3D object by moving the pointer object while causing the pointer object to hold the first 3D object in movement,
the controller executes a reaction command, when holding of the first 3D object by the pointer object is released during the reaction effect on at least one of the first 3D object and the second 3D object,
the controller executes a collision command, when holding of the first object by the pointer object is released during the collision effect on at least one of the first 3D object and the second 3D object, and
the collision command is different than the reaction command.

12. The information processing device according to claim 11, wherein
the reaction command causes a process of the second 3D object executed on the first 3D object, and
the collision command causes a process of interchanging a display position of the first 3D object and a display position of the second 3D object.

13. The information processing device according to claim 1, wherein one of the reaction effect and the collision effect is performed or both the reaction effect and the collision effect are substantially simultaneously performed, on at least one of the first 3D object and the second 3D object.

14. The information processing device according to claim 13, wherein both the reaction effect and the collision effect are substantially simultaneously performed on only one of the first 3D object and the second 3D object.

15. An information processing method comprising:
displaying a first 3D object and a second 3D object on a display screen in a virtual three-dimensional space with the third dimension being a depth direction of the display screen, wherein:
the first 3D object has a first collision region surrounding the first 3D object,
the first 3D object has a first reaction region surrounding both the first 3D object and the first collision region,
the first reaction region is larger than the first collision region in at least the depth direction,
the second 3D object has a second collision region surrounding the second 3D object,
the second 3D object has a second reaction region surrounding both the second 3D object and the second collision region, and
the second reaction region is larger than the second collision region in at least the depth direction;
moving the first 3D object on the display screen in accordance with a received user input instruction;
executing a reaction effect when the first reaction region of the first 3D object overlaps the second reaction region of the second 3D object; and
executing a collision effect when the first collision region of the first 3D object overlaps the second collision region of the second 3D object, wherein the reaction effect is different from the collision effect.

16. A non-transitory computer-readable medium having embodied thereon a program, which when executed by a computer, causes a computer to function as:
a display section, wherein:
the display section comprises a display screen configured to display a first 3D object and a second 3D object in a virtual three-dimensional space with the third dimension being a depth direction of the display screen,
the first 3D object has a first collision region surrounding the first 3D object,
the first 3D object has a first reaction region surrounding both the first 3D object and the first collision region,
the first reaction region is larger than the first collision region in at least the depth direction,
the second 3D object has a second collision region surrounding the second 3D object,
the second 3D object has a second reaction region surrounding both the second 3D object and the second collision region, and
the second reaction region is larger than the second collision region in at least the depth direction; and
a controller, wherein:
the controller is configured to move the first 3D object on the display screen in accordance with a received user input instruction,
the controller is configured to execute a reaction effect when the first reaction region of the first 3D object overlaps the second reaction region of the second 3D object,
the controller is configured to execute a collision effect when the first collision region of the first 3D object overlaps the second collision region of the second 3D object, and
the reaction effect is different from the collision effect.

* * * * *